(12) United States Patent
Nomura et al.

(10) Patent No.: US 7,372,483 B2
(45) Date of Patent: May 13, 2008

(54) IMAGE PICKUP DEVICE AND CAMERA SHAKE CORRECTION METHOD

(75) Inventors: Hirofumi Nomura, Saitama (JP); Jinyo Kumaki, Tokyo (JP); Hirotaka Hirano, Gifu (JP)

(73) Assignee: Sony Corporation (JP)

( * ) Notice: Subject to any disclaimer, the term of this patent is extended or adjusted under 35 U.S.C. 154(b) by 718 days.

(21) Appl. No.: 10/807,780

(22) Filed: Mar. 24, 2004

(65) Prior Publication Data

US 2004/0218056 A1  Nov. 4, 2004

(30) Foreign Application Priority Data

Apr. 1, 2003  (JP) .......................... P2003-098245

(51) Int. Cl.
*H04N 5/228* (2006.01)
(52) U.S. Cl. .............. 348/208.99; 348/208.1; 396/55
(58) Field of Classification Search .......... 348/208.99, 348/208.1, 208.2; 396/55
See application file for complete search history.

(56) References Cited

U.S. PATENT DOCUMENTS 5,926,212 A    7/1999  Kondo ........................ 348/208
5,990,942 A   11/1999  Ogino ........................ 348/208
6,704,502 B2 * 3/2004  Morofuji ....................... 396/55
6,707,991 B2 * 3/2004  Mizumura .................... 396/55
2001/0002225 A1 * 5/2001  Sekine et al. ................. 396/55
2003/0147636 A1 * 8/2003  Yamazaki .................... 396/55

FOREIGN PATENT DOCUMENTS

| EP | 0574228 | 6/1993 |
|----|---------|--------|
| EP | 0611125 | 2/1994 |
| EP | 0641123 | 8/1994 |
| JP | 07-327160 | 12/1995 |

\* cited by examiner

*Primary Examiner*—Lin Ye
*Assistant Examiner*—Gevell Selby
(74) *Attorney, Agent, or Firm*—Lerner, David, Littenberg, Krumholz & Mentlik, LLP

(57) ABSTRACT

In an image pickup device, a controller includes a surplus area calculation unit to detect a surplus area for use in correcting camera shake based upon a size of an effective area on an image pickup surface and a size of an efficient area extracted in response to camera shake. Thus, this image pickup device can prevent a troublesome aspect in which camera shake correction reaches the correction end from occurring, even when a large camera shake that is beyond the surplus area occurs.

6 Claims, 4 Drawing Sheets

| Integration Coeff. Calculation Unit Input (Pixel) | Integration Coeff. |
|---|---|
| 100 | 1.00 |
| 90 | 0.95 |
| 80 | 0.90 |
| 70 | 0.85 |
| 60 | 0.80 |
| 50 | 0.70 |
| 40 | 0.60 |
| 30 | 0.50 |
| 20 | 0.40 |
| 10 | 0.20 |
| 0 | 0.00 |

IMAGE PICKUP DEVICE AND CAMERA SHAKE CORRECTION METHOD

BACKGROUND OF THE INVENTION

1. Field of the Invention

The present invention relates to an image pickup device for effecting camera shake correction on an image signal and a camera shake correction method.

2. Description of the Related Art

A cited patent reference 1 has disclosed so far a camera shake correction device comprising a pitching and yawing amount detecting means for detecting an amount in which an image is pitched or yawed due to vibrations of a video camera body, a correction signal generating means for generating a correction signal to correct pitching or yawing of an image based upon a detected output from the pitching and yawing amount detecting means, the correction range of the correction signal generating means being set freely variable, a correcting means operable so as to correct pitching or yawing of the image in response to the correction signal generated from the correction signal generating means, an operation range detecting means for detecting an operation range of the correcting means and a correction range setting means for variably setting a correction range based upon a detected output from the operation range detecting means.

The above-mentioned related-art image pickup device is able to shoot a wide-angle image by extending an efficient area that is extracted when camera shake is corrected. In that case, although the image in the efficient area has to be converted into an image with resolution of a television signal, it is possible to realize an image of wider-angle by extending the efficient area to the size of the whole area of the image pickup surface.

[Cited Patent Reference 1]

Japanese laid-open patent application No. 7-327160

However, the above-mentioned related-art image pickup device is requested to correct large camera shake as a magnification of lens is increased. When a surplus area used to correct camera shake decreases as an image becomes a wide-angle image and large camera shake which is beyond the surplus area occurs, there is then a disadvantage that a troublesome aspect in which camera shake correction reaches the correction end will occur. The reason for this is that the camera shake correction is suddenly limited at the correction end so that an image extraction area is fixed.

In accordance with the cited patent reference 1, since the operation range of the correction means is a linear integration output and this linear integration output indicates an output obtained when a constant integration coefficient is designated regardless of the size of the surplus area, the linear integration output is limited at the same time it reaches the correction end, and hence there is then a disadvantage that a troublesome aspect in which an image suddenly reaches the correction end will occur.

SUMMARY OF THE INVENTION

In view of the aforesaid aspect, it is an object of the present invention to provide an image pickup device in which a troublesome aspect in which an image reaches the correction end can be prevented from occurring even when a large camera shake signal which is beyond a surplus area is inputted.

It is another object of the present invention to provide an image pickup device in which a troublesome aspect caused when camera shake correction is suddenly limited at the correction end by the input of a large camera shake signal can be decreased.

It is other object of the present invention to provide an image pickup device in which a stereotyped camera shake correction can be carried out at high speed.

It is a further object of the present invention to provide a camera shake correction method in which a troublesome aspect in which an image reaches the correction end can be prevented from occurring even when a large camera shake signal which is beyond a surplus area is inputted.

It is yet a further object of the present invention to provide a camera shake correction method in which a troublesome aspect caused when camera shake correction is suddenly limited at the correction end by the input of large camera shake signal can be decreased.

It is still a further object of the present invention to provide a camera shake correction method in which a stereotyped camera shake correction can be carried out at high speed.

According to an aspect of the present invention, there is provided an image pickup device which is comprised of an image pickup means, a camera shake detecting means for detecting camera shake to provide a camera shake detection signal and a correcting means for correcting camera shake of an image pickup signal obtained from the image pickup means by using the camera shake detection signal detected by the camera shake detecting means, wherein the correcting means includes a surplus area detecting means for detecting a surplus area for use in camera shake correction based upon a size of an effective area on an image pickup surface and a size of an efficient area extracted in response to camera shake.

According to the present invention, the surplus area detecting means calculates a size of a current surplus area from a correction amount obtained from the last correction processing. The integration coefficient control means calculates an integration coefficient of a camera shake signal based upon a difference between a size of the surplus area and a magnitude of an inputted camera shake signal.

Then, the thus calculated integration coefficient and the correction amount of the last correction processing are multiplied, and the thus multiplied result and the camera shake signal are integrated. Thus, camera shake of the image pickup signal can be corrected by using the thus calculated correction amount.

According to another aspect of the present invention, there is provided a camera shake correction method which is comprised of the steps of an image pickup step for obtaining an image pickup signal, a camera shake detection step for detecting a camera shake detection signal and a correction step for correcting camera shake of the image pickup signal obtained from the image pickup step by using the camera shake detection signal detected at the camera shake detection step, wherein the correction step includes a surplus area detection step for detecting a surplus area for use in camera shake correction based upon a size of an effective area on an image pickup surface and a size of an efficient area extracted in response to camera shake.

According to the present invention, the surplus area detection step calculates a size of a current surplus area from a correction amount obtained from the last correction processing. The integration coefficient control step calculates an integration coefficient of a camera shake signal based upon a difference between a size of the surplus area and a magnitude of an inputted camera shake signal.

Then, the thus calculated integration coefficient and the correction amount of the last correction processing are multiplied, and the thus multiplied result and the camera shake signal are integrated. Thus, camera shake of the image pickup signal can be corrected by using the thus calculated correction amount.

BRIEF DESCRIPTION OF THE DRAWINGS

FIGS. 3A and 3B are respectively diagrams showing an effective area, an efficient area and a surplus area on an image pickup surface, wherein FIG. 3A shows the efficient area and the effective area on the image pickup surface and FIG. 3B shows the surplus area on the image pickup surface;

DESCRIPTION OF THE PREFERRED EMBODIMENT

An image pickup device and a camera shake correction method according to an embodiment of the present invention will be described below with reference to the drawings.

[System Arrangement]

Figure 1:
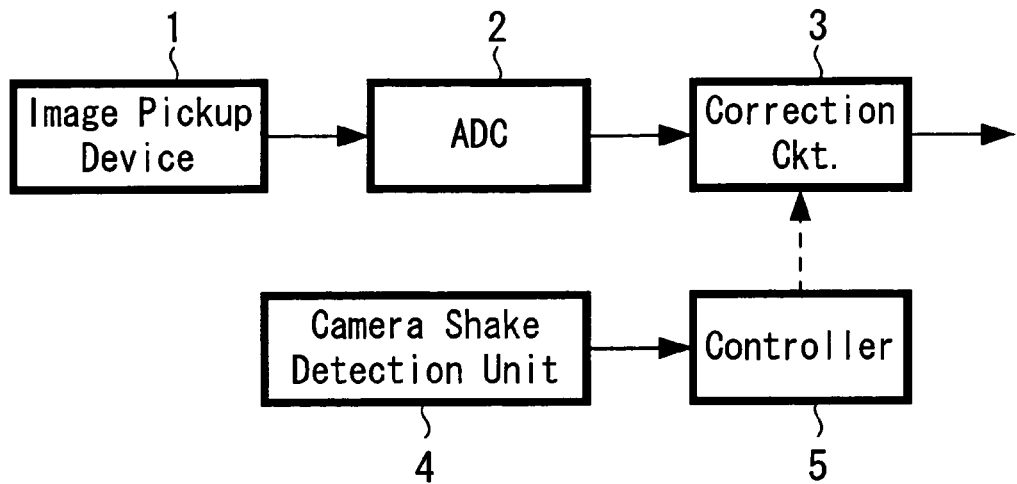
FIG. 1 is a schematic block diagram showing a camera shake correction device for use with an image pickup device which is applied to the embodiment of the present invention.

FIG. 1 of the accompanying drawings shows in block form a camera shake correction device for use with an image pickup device which is applied to the embodiment of the present invention.

As shown in FIG. 1, an image pickup device 1 outputs an image of a whole area (effective area) on an image pickup surface in the form of an analog signal. An analog-to-digital converter (ADC) 2 converts the analog signal outputted from the image pickup device 1 into a digital signal. A correction circuit 3 extracts an area (efficient area) from one portion of the effective area in accordance with a correction amount outputted from a controller 5. A camera shake detection unit 4 detects camera shake applied to the image pickup device. The camera shake detection unit 4 is able to detect camera shake by using a detection method based upon a suitable means such as a gyro sensor and image recognition. The controller 5 calculates a correction amount for extracting the efficient area from the effective area based upon a surplus area for use in correcting camera shake and a camera shake signal outputted from the camera shake detection unit 4 and outputs the thus calculated correction amount to the correction circuit 3.

Figure 2:
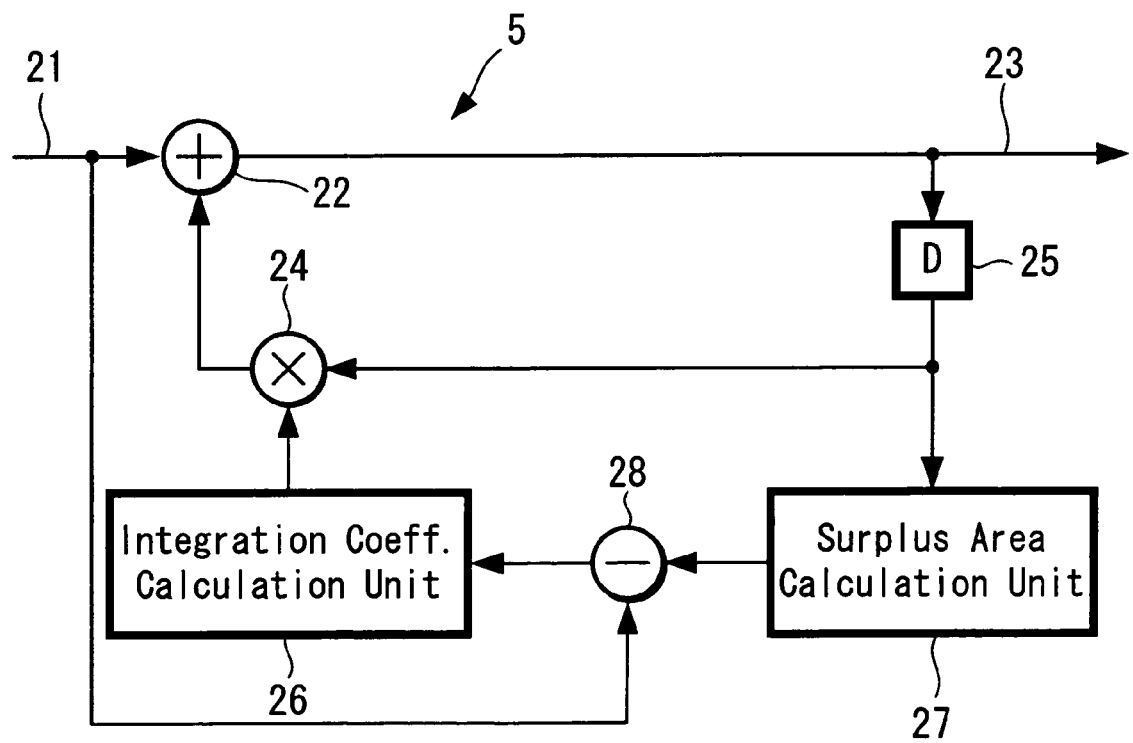
FIG. 2 is a schematic block diagram showing an integration unit of a controller for use with the camera shake correction device which is applied to the embodiment of the present invention.

FIG. 2 is a schematic block diagram showing an integration unit in the controller 5 of the camera shake correction device which is applied to the embodiment of the present invention.

As shown in FIG. 2, a camera shake signal input 21 obtains the camera shake signal outputted from the camera shake detection unit 4 shown in FIG. 1. An integrator 22 integrates the camera shake signal input 21 and a signal from a multiplier 24. A correction output 23 outputs a signal integrated by the integrator 22. A multiplier 24 multiplies an integration coefficient obtained from an integration coefficient calculation unit 26 with a signal from a delay device 25. The delay device 25 delays the signal of the correction output 23. The integration coefficient calculation unit 26 calculates an integration coefficient for use with the multiplier 24 based upon a difference from a subtractor 28 between a size of a surplus area obtained from a surplus area calculation unit 27 and a magnitude of an inputted camera shake signal. The surplus area calculation unit 27 calculates a size of a surplus area, which can be used to correct camera shake on the image pickup surface, on the basis of a correction amount obtained through the delay device 25.

[Calculation of Surplus Area]

Figure 3A:
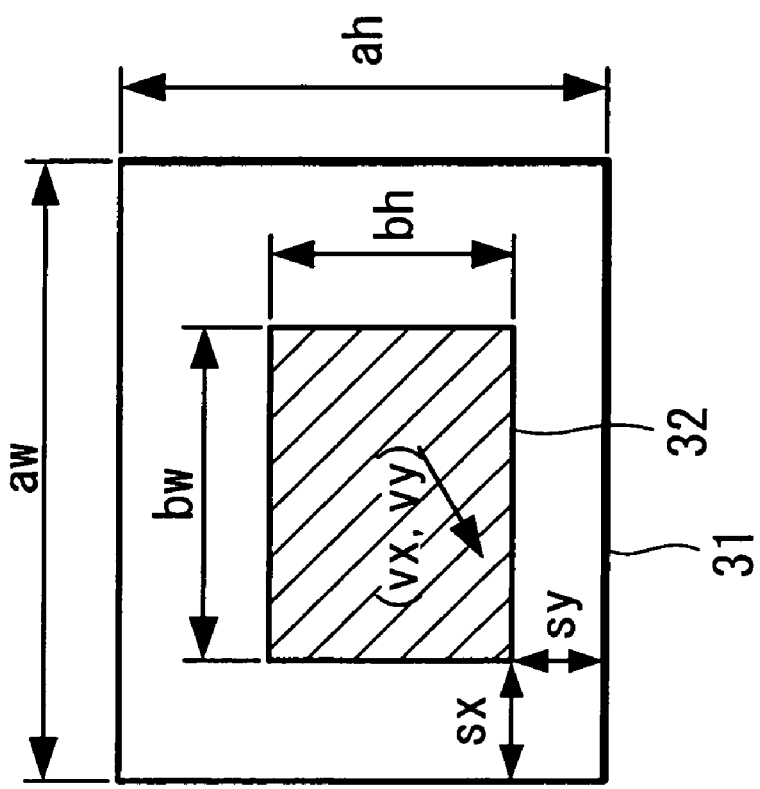
Figure 3B:
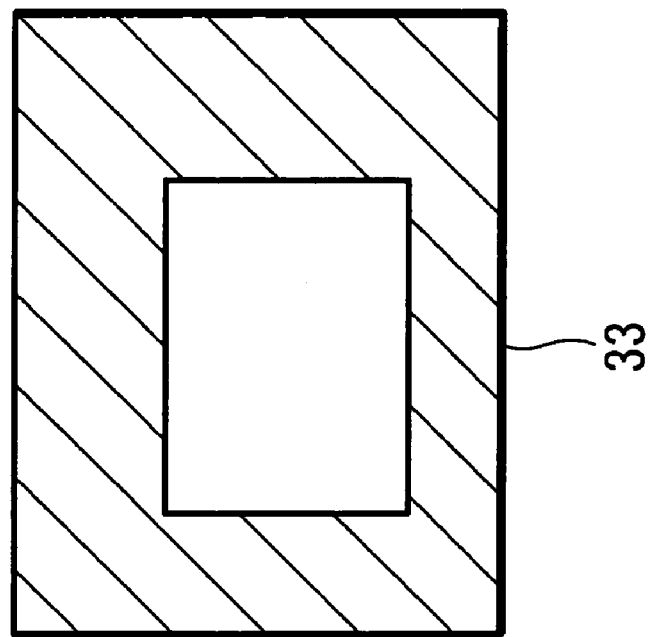

FIGS. 3A and 3B are schematic diagrams showing an effective area, an efficient area and a surplus area on an image pickup surface.

FIG. 3A shows the effective area, the efficient area, a camera shake vector and the surplus area on the image pickup surface.

Assuming now that an effective area 31 has a height ah and a width aw, that an efficient area 32 has a height bh and a width bw and that a last correction vector is $[vx_{-1}, vy_{-1}]$, then a surplus area 33 that can be used to correct camera shake is expressed by an area which is not made common to the effective area 31 and the efficient area 32 as shown in FIG. 3B. The sizes of the effective area 31 and efficient area 32 are not fixed and may be changed dynamically in response to a suitable factor such as a zoom magnification. At that time, in the area that can be used to correct camera shake, a height sy of the side near the correction end can be expressed by the following equation (1) and a width sx near the correction end can be expressed by the following equation (2).

$$sy = (ah-bh)/2 - |vy_{-1}| \tag{1}$$

$$sx = (aw-bw)/2 - |vx_{-1}| \tag{2}$$

[Calculation of Integration Coefficient]

Figure 4:
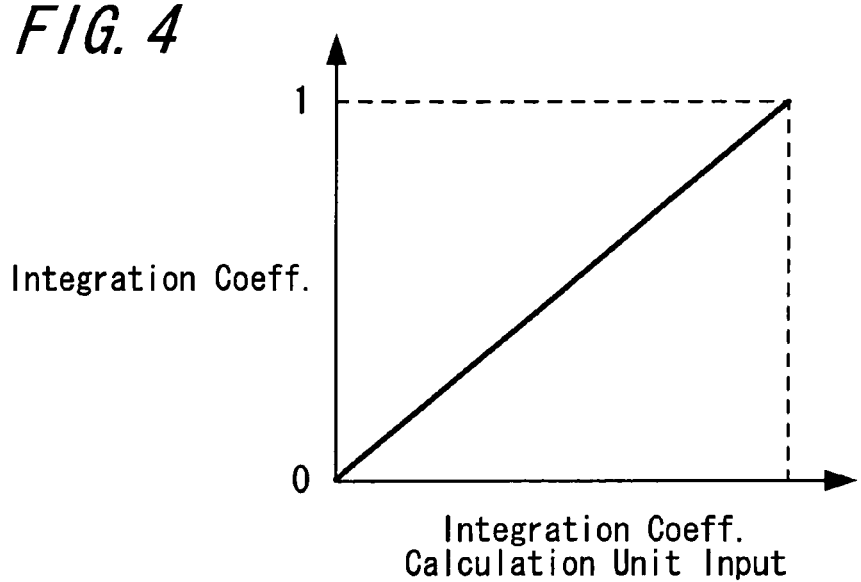
FIG. 4 is a diagram showing a relationship between an input signal inputted to an integration coefficient calculation unit and an integration coefficient.

FIG. 4 is a diagram showing a relationship between an integration coefficient calculation unit input and an integration coefficient.

As shown in FIG. 4, the integration coefficient monotonically increases relative to the integration coefficient calculation unit input. Assuming that f represents a function that can satisfy the above-described relationship, tx represents a magnitude of an inputted camera shake in the longitudinal direction, ty represents a magnitude of an inputted camera shake in the horizontal direction, ky represents an integration coefficient of the longitudinal direction and that kx represents an integration coefficient of the horizontal direction, then the integration coefficient ky of the longitudinal direction can be expressed by the following equation (3) and the integration coefficient kx of the horizontal direction can be expressed by the following equation (4):

$$ky = f(sy-ty) \tag{3}$$

$$kx = f(sx-tx) \quad (4)$$

If there is a large area that can be corrected, then the integration coefficient should be increased in order to increase efficiency of correction. If on the other hand there is a small area that can be corrected, then the integration coefficient should be decreased in order to decrease efficiency of correction. Under the circumstances in which the surplus length is short so that the integration coefficient will reach the correction end, a possibility in which the integration coefficient will reach the correction end can be decreased by lowering efficiency of correction.

[Calculation of Correction Amount]

Correction vector (vy0, vx0) of the longitudinal direction or the horizontal direction can be calculated from the above-described integration coefficient. Assuming that (mvx, mvy) represents a camera shake motion vector, then the longitudinal direction correction vector vy0 can be expressed by the following equation (5) and the horizontal direction correction vector vx0 can be expressed by the following equation (6):

$$vy0 = mvy + ky*vy_{-1} \quad (5)$$

$$vx0 = mvx + kx*vx_{-1} \quad (6)$$

[Flowchart of Control Operation]

Figure 5:
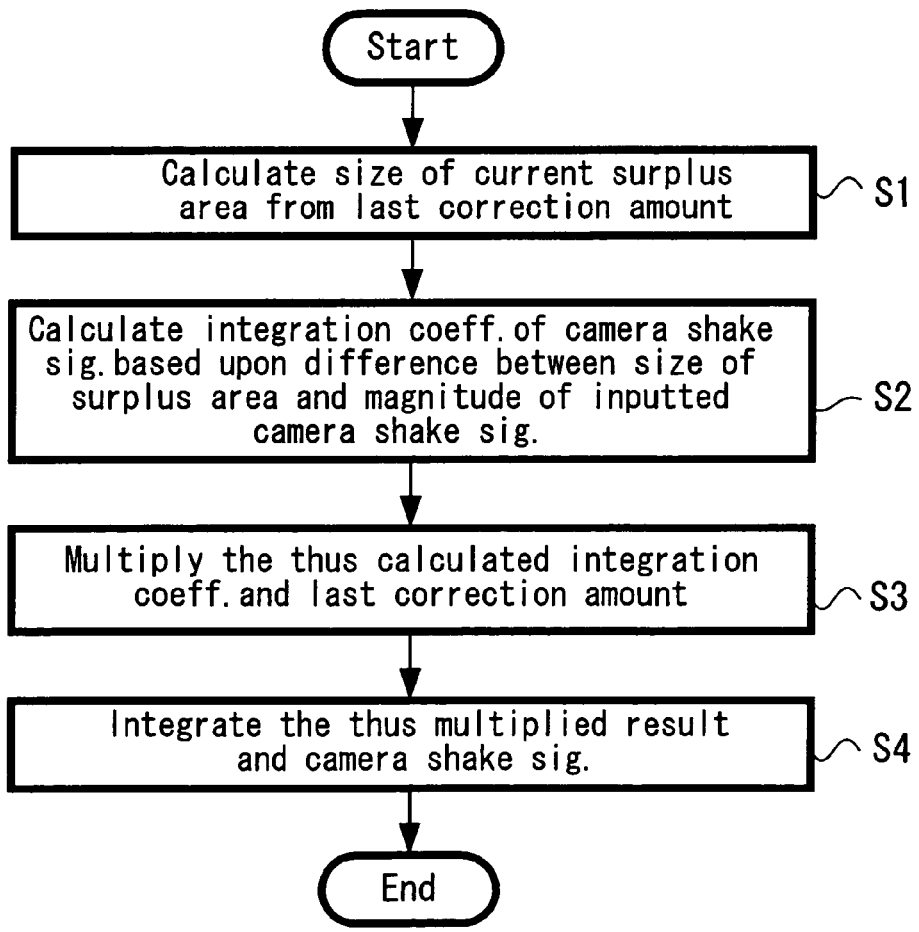
FIG. 5 is a flowchart to which reference will be made in explaining a camera shake correction control operation which is applied to the embodiment of the present invention.

FIG. 5 is a flowchart to which reference will be made in explaining a camera shake correction control operation that is applied to the embodiment of the present invention.

This flowchart shown in FIG. 5 is read out from a memory (not shown) provided within the controller 5 each time a camera shake correction control operation is carried out.

Referring to FIG. 5, and following the start of operation, at a step S1, a size of a current surplus area is calculated from the last correction amount. More specifically, the surplus area calculation unit 27 shown in FIG. 2 calculates the size of the current surplus area from the last correction amount supplied from the delay device 25.

Then, control goes to the next step S2, whereat an integration coefficient of a camera shake signal is calculated from a difference between the size of the above-described surplus area and the magnitude of the inputted camera shake. More specifically, the integration coefficient calculation unit 26 calculates the integration coefficient of the camera shake signal from the difference between the size of the surplus area and the magnitude of the inputted camera shake.

Then, control goes to the next step S3, whereat the thus calculated integration coefficient and the last correction amount are multiplied with each other. More specifically, the multiplier 24 multiplies the thus calculated integration coefficient with the last correction amount.

Then, control goes to the next step S4, whereat the above-described multiplied result and the camera shake signal are integrated. More specifically, the integrator 22 integrates the above-described multiplied result and the camera shake signal.

In this manner, the controller 5 calculates a correction amount and the correction circuit 3 corrects camera shake based upon the thus calculated correction amount under control of the controller 5.

[Comparison of Integrated Outputs]

Figures 6, 7:
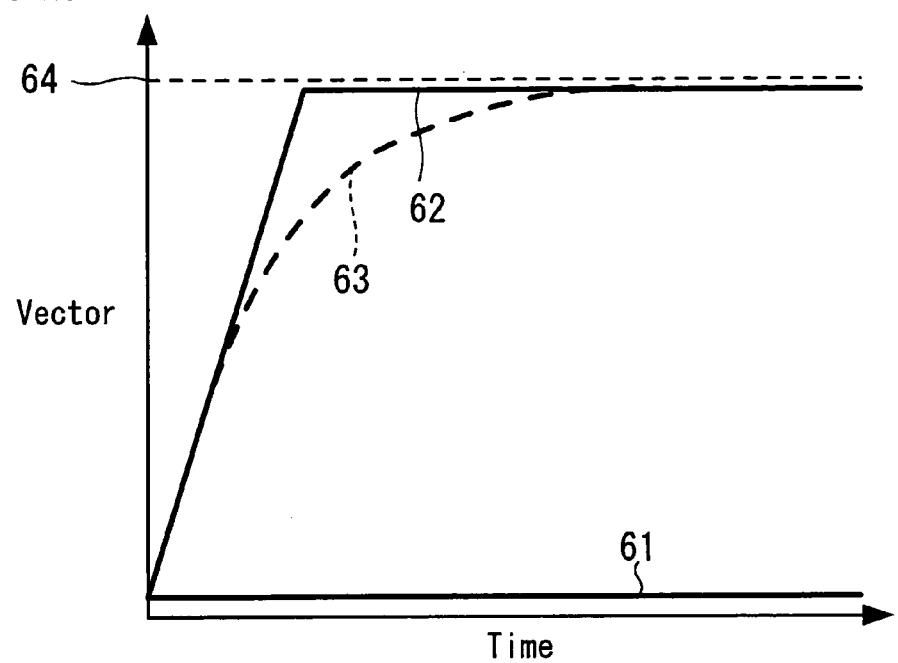
FIG. 6 is a diagram showing compared results of a linear integration output and a nonlinear integration output.
FIG. 7 is a diagram showing a table of integration coefficients relative to the surplus area of the image pickup surface.

FIG. 6 is a diagram showing compared results obtained when a prior-art integrated output and an inventive integrated output are compared with each other.

As shown in FIG. 6, an integrated input 61 shows an integrated output obtained when it is set to a DC component. A linear integrated output 62 is obtained according to the prior-art system and shows an output obtained when a constant integration coefficient is designated regardless of the size of the surplus area. A nonlinear integrated output 63 is obtained according to the inventive system and shows an output obtained when the integration coefficient is dynamically changed in response to the size of the surplus area. At the same time the linear integrated output 62 reaches a correction end 64, it is limited, and hence a troublesome aspect in which an image suddenly reaches the correction end 64 occurs. On the other hand, since efficiency of correction is decreased before the nonlinear integrated output 63 reaches the correction end 64, even when the nonlinear integrated output 63 reaches the correction end 64 and is thereby limited, an image can be prevented from suddenly reaching the correction end 64.

FIG. 7 is a diagram showing a table of integration coefficient relative to the surplus area. The table shown in FIG. 7 is calculated in advance by the surplus area calculation unit 27 (see FIG. 2) and the integration coefficient calculation unit 26 (see FIG. 2) and is then stored in a memory (not shown) provided within the controller 5.

As shown in FIG. 7, in the table, an integration coefficient 72 is outputted as "1.00" when an integration coefficient calculation unit input (pixel) of a surplus area 71 is "100"; the integration coefficient 72 is outputted as "0.95" when the integration coefficient calculation unit input (pixel) of the surplus area 71 is "90"; the integration coefficient 72 is outputted as "0.90" when the integration coefficient calculation unit input (pixel) of the surplus area is "80"; the integration coefficient 72 is outputted as "0.85" when the integration coefficient calculation unit input (pixel) of the surplus area 71 is "70"; the integration coefficient 72 is outputted as "0.80" when the integration coefficient calculation unit input (pixel) of the surplus area 71 is "60"; the integration coefficient 72 is outputted as "0.70" when the integration coefficient calculation unit input (pixel) of the surplus area 71 is "50"; the integration coefficient 72 is outputted as "0.60" when the integration coefficient calculation unit input (pixel) of the surplus area 71 is "40"; the integration coefficient 72 is outputted as "0.50" when the integration coefficient calculation unit input (pixel) of the surplus area 71 is "30"; the integration coefficient 72 is outputted as "0.40" when the integration coefficient calculation unit input (pixel) of the surplus area 71 is "20"; the integration coefficient 72 is outputted as "0.20" when the integration coefficient calculation unit input (pixel) of the surplus area 71 is "10"; and the integration coefficient 72 is outputted as "0.00" when the integration coefficient calculation unit input (pixel) of the surplus area 71 is "0".

According to the embodiment of the present invention, since the size of the surplus area necessary for correcting camera shake is detected and the integration coefficient used to integrate the camera shake signal is changed in response to the difference between the size of the surplus area and the magnitude of the input camera shake signal, it is possible to decrease the troublesome aspect caused when the camera shake correction is suddenly limited at the correction end in response to the input of the large camera shake signal.

According to the present invention, in an image pickup device comprising an image pickup means, a camera shake detecting means for detecting camera shake to provide a camera shake detection signal and a correcting means for correcting camera shake of an image pickup signal obtained from the image pickup means by using the camera shake detection signal detected by the camera shake detecting means, since the correcting means includes a surplus area detecting means for detecting a surplus area for use in camera shake correction based upon a size of an effective area on an image pickup surface and a size of an efficient area extracted in response to camera shake, it is possible to decrease the troublesome aspect caused when the camera shake correction is suddenly limited at the correction end in response to the input of the large camera shake signal, by detecting the size of the surplus area necessary for correcting camera shake and controlling the camera shake signal in response to the surplus area.

In the image pickup device according to the present invention, since the correcting means includes an integrating means for integrating the camera shake detection signal linearly or nonlinearly and an integration coefficient control means for dynamically changing an integration coefficient used to integrate the camera shake detection signal in response to a difference between a size of the surplus area and a magnitude of the camera shake detection signal, it is possible to decrease the troublesome aspect caused when the camera shake correction is suddenly limited at the correction end in response to the input of the large camera shake signal, by detecting the size of the surplus area necessary for correcting camera shake and changing an integration coefficient in response to a difference between a size of the surplus area and a magnitude of the camera shake detection signal.

In the image pickup device according to the present invention, since the correcting means includes a table having integration coefficients relative to sizes of the surplus area, a stereotyped camera shake correction processing can be carried out at high speed by using the surplus areas and the integration coefficients stored in the memory after they have been calculated by the surplus area calculation unit and the integration coefficient calculation unit.

According to the present invention, in a camera shake correction method which is comprised of the steps of an image pickup step for obtaining an image pickup signal, a camera shake detection step for detecting a camera shake detection signal and a correction step for correcting camera shake of the image pickup signal obtained from said image pickup step by using the camera shake detection signal detected at, the camera shake detection step, since the correction step includes a surplus area detection step for detecting a surplus area for use in camera shake correction based upon a size of an effective area on an image pickup surface and a size of an efficient area extracted in response to camera shake, it is possible to decrease the troublesome aspect caused when the camera shake correction is suddenly limited at the correction end in response to the input of the large camera shake signal, by detecting the size of the surplus area necessary for correcting camera shake and controlling the camera shake signal in response to the surplus area.

Further, in the camera shake correction method according to the present invention, since the correction step includes an integration step for integrating the camera shake detection signal linearly or nonlinearly and an integration coefficient control step for dynamically changing an integration coefficient used to integrate the camera shake detection signal in response to a difference between a size of the surplus area and a magnitude of the camera shake detection signal, it is possible to decrease the troublesome aspect caused when the camera shake correction is suddenly limited at the correction end in response to the input of the large camera shake signal, by detecting the size of the surplus area necessary for correcting camera shake and changing an integration coefficient in response to a difference between a size of the surplus area and a magnitude of the camera shake detection signal.

In the camera shake correction method according to the present invention, since the correction step corrects camera shake by using a table having integration coefficients relative to sizes of the surplus area, a stereotyped camera shake correction processing can be carried out at high speed by using the surplus areas and the integration coefficients stored in the memory after they have been calculated by the surplus area calculation unit and the integration coefficient calculation unit.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An image pickup device for use in a camera, the device comprising:
    image pickup means;
    camera shake detecting means for detecting a camera shake and outputting a camera shake detection signal; and
    correcting means for correcting a camera shake of an image pickup signal obtained from said image pickup means by using said camera shake detection signal,
    wherein said correcting means includes surplus area detecting means for detecting a surplus area for use in camera shake correction based upon a size of an effective area on an image pickup surface of the image pickup means and a size of an efficient area extracted in response to the camera shake, integrating means for integrating said camera shake detection signal and integration coefficient control means for dynamically changing an integration coefficient used to integrate said camera shake detection signal in response to a difference between a size of said surplus area and a magnitude of said camera shake detection signal.

2. The image pickup device according to claim 1, wherein said correcting means includes a table having a plurality of integration coefficients relative to a respective plurality of sizes of said surplus area.

3. A camera shake correction method comprising:
    an image pickup step for obtaining an image pickup signal;
    a camera shake detection step for detecting a camera shake and outputting a camera shake detection signal; and
    a correction step for correcting a camera shake of said image pickup signal obtained from said image pickup step by using said camera shake detection signal,
    wherein said correction step includes a surplus area detection step for detecting a surplus area for use in a camera shake correction based upon a size of an effective area on an image pickup surface and a size of an efficient area extracted in response to the camera shake, an integration step for integrating said camera shake detection signal and an integration coefficient control step for dynamically changing an integration coefficient used to integrate said camera shake detection signal in response to a difference between a size of said surplus area and a magnitude of said camera shake detection signal.

4. The camera shake correction method according to claim 3, wherein said correction step corrects the camera shake by using a table having a plurality of integration coefficients relative to a respective plurality of sizes of said surplus area.

5. The image pickup device according to claim 1, in which said correcting means further includes a multiplier for multiplying the integration coefficient with a signal corresponding to an output signal from the integrating means so as to obtain a multiplied signal and for supplying the multiplied signal to the integrating means and in which the integrating means integrates said camera shake detection signal and the multiplied signal.

6. The camera shake correction method according to claim 3, in which the correcting step further includes a multiplying step for multiplying the integration coefficient with a signal corresponding to an output signal obtained from the integrating step so as to obtain a multiplied signal and in which the integrating step integrates said camera shake detection signal and the multiplied signal.

* * * * *